United States Patent
Forbes et al.

(10) Patent No.: US 10,897,378 B2
(45) Date of Patent: *Jan. 19, 2021

(54) FULL DUPLEX RADIO IN WIRELESS TUNNELING SYSTEM

(71) Applicant: Ubistar Technology, Inc., Cupertino, CA (US)

(72) Inventors: Mark Graham Forbes, San Carlos, CA (US); Shi Cheng, Cupertino, CA (US); Dmitry Cherniavsky, San Jose, CA (US); Chinh Huy Doan, San Jose, CA (US); Sohrab Emami, San Francisco, CA (US); Ricky Keangpo Ho, San Jose, CA (US); Nishit Kumar, San Jose, CA (US); Patrick Thomas McElwee, Sunnyvale, CA (US); James R. Parker, Palo Alto, CA (US); Nitesh Singhal, Santa Clara, CA (US); Ron Zeng, Saratoga, CA (US)

(73) Assignee: Ubistar Technology, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/116,782

(22) Filed: Aug. 29, 2018

(65) Prior Publication Data
US 2019/0028301 A1 Jan. 24, 2019

Related U.S. Application Data

(63) Continuation of application No. 15/073,348, filed on Mar. 17, 2016, now Pat. No. 10,091,026.
(Continued)

(51) Int. Cl.
*H04L 12/46* (2006.01)
*H04L 5/14* (2006.01)
(Continued)

(52) U.S. Cl.
CPC ........... *H04L 12/4633* (2013.01); *H04L 5/14* (2013.01); *H04L 27/04* (2013.01); *H04L 27/063* (2013.01)

(58) Field of Classification Search
CPC ... H04L 12/4633; H04L 27/063; H04L 27/04; H04L 5/14; H04L 1/0042
See application file for complete search history.

(56) References Cited

U.S. PATENT DOCUMENTS

| 7,487,426 B2 | 2/2009 | Hoyer |
| 7,639,687 B1 | 12/2009 | Tsai et al. |

(Continued)

FOREIGN PATENT DOCUMENTS

| JP | 2005044094 A | 2/2005 |
| JP | 2014192572 A | 10/2014 |

(Continued)

OTHER PUBLICATIONS

Japan Patent Office, Office Action for Japanese Application No. JP2017-548924 dated Jun. 25, 2019.
(Continued)

*Primary Examiner* — Tejis Daya
(74) *Attorney, Agent, or Firm* — Rimon PC

(57) ABSTRACT

Disclosed wireless tunneling system includes two wireless tunneling apparatuses that communicate with each other through the wireless link. A local wireless tunneling apparatus is coupled to a local processing apparatus through a wired connection and a remote wireless tunneling apparatus is coupled to the remote processing apparatus through another wired connection. The two processing apparatuses bi-directionally communicate with each other through the wireless link using the two wireless tunneling apparatuses as if the two processing apparatuses were connected through a wired connection.

18 Claims, 4 Drawing Sheets

Related U.S. Application Data

(60) Provisional application No. 62/135,007, filed on Mar. 18, 2015.

(51) Int. Cl.
*H04L 27/04* (2006.01)
*H04L 27/06* (2006.01)

(56) References Cited

U.S. PATENT DOCUMENTS

| | | |
|---|---|---|
| 7,978,099 B2 | 7/2011 | Lee et al. |
| 9,635,680 B2 | 4/2017 | Odlyzko et al. |
| 9,883,539 B2 | 1/2018 | Emami et al. |
| 2003/0052778 A1 | 3/2003 | Wong |
| 2003/0189974 A1* | 10/2003 | Ferry ............... H04B 1/50 375/219 |
| 2005/0027889 A1 | 2/2005 | Sandulescu |
| 2005/0138229 A1 | 6/2005 | Sartore |
| 2008/0080598 A1* | 4/2008 | Mo ............... H04L 27/0008 375/219 |
| 2008/0205417 A1* | 8/2008 | Li ............... H04L 12/66 370/401 |
| 2008/0215773 A1 | 9/2008 | Christison et al. |
| 2009/0190595 A1 | 7/2009 | Jiang et al. |
| 2009/0238568 A1* | 9/2009 | Lyubomirsky ..... H04B 10/5167 398/79 |
| 2010/0099366 A1* | 4/2010 | Sugar ............... H04B 1/005 455/75 |
| 2010/0141894 A1 | 6/2010 | Sahraie |
| 2010/0169523 A1 | 7/2010 | Dunstan et al. |
| 2011/0065448 A1* | 3/2011 | Song ............... H04B 7/0632 455/452.2 |
| 2011/0087903 A1 | 4/2011 | MacDougall et al. |
| 2011/0205444 A1* | 8/2011 | Yamamoto ............ H04N 7/163 348/726 |
| 2011/0317595 A1 | 12/2011 | Kanda et al. |
| 2012/0307842 A1 | 12/2012 | Petrov et al. |
| 2013/0007324 A1 | 1/2013 | Moore et al. |
| 2013/0010849 A1* | 1/2013 | Shimizu ............... H04L 5/06 375/219 |
| 2013/0051440 A1 | 2/2013 | Rofougaran |
| 2013/0124762 A1 | 5/2013 | Tamir et al. |
| 2013/0215805 A1* | 8/2013 | Hong ............... H04B 15/00 370/281 |
| 2013/0235886 A1 | 9/2013 | Wang |
| 2013/0287077 A1 | 10/2013 | Fernando et al. |
| 2013/0343235 A1* | 12/2013 | Khan ............... H04B 1/56 370/278 |
| 2014/0040486 A1 | 2/2014 | Christie |
| 2014/0122752 A1 | 5/2014 | Toivanen et al. |
| 2014/0136921 A1 | 5/2014 | Murakami |
| 2014/0161174 A1 | 6/2014 | Mohsenian |
| 2014/0219191 A1 | 8/2014 | Stephens et al. |
| 2014/0233436 A1* | 8/2014 | Long ............... H04B 7/0617 370/278 |
| 2015/0230263 A1* | 8/2015 | Roy ............... H04W 16/28 455/452.2 |
| 2016/0190996 A1* | 6/2016 | Searle ............... H03F 1/0277 330/295 |
| 2016/0198410 A1* | 7/2016 | Cherniavsky ..... H04W 52/0229 370/278 |
| 2016/0216757 A1 | 7/2016 | Kim et al. |
| 2016/0278013 A1* | 9/2016 | Shellhammer .... H04W 52/0225 |
| 2016/0334837 A1 | 11/2016 | Dees et al. |
| 2017/0111866 A1* | 4/2017 | Park ............... H04W 52/0235 |
| 2017/0141894 A1* | 5/2017 | Wei ............... H04B 17/309 |
| 2017/0208494 A1* | 7/2017 | Moon ............... H04W 24/10 |
| 2017/0346539 A1* | 11/2017 | Islam ............... H04B 7/043 |

FOREIGN PATENT DOCUMENTS

| | | |
|---|---|---|
| JP | 2015037275 A | 2/2015 |
| WO | 2010090732 A | 8/2010 |

OTHER PUBLICATIONS

PCT International Search Report and Written Opinion, PCT Application No. PCT/US2016/023220, dated Jun. 28, 2016, 16 pages.
PCT International Search Report and Written Opinion, PCT Application No. PCT/US2016/023199, dated Jul. 8, 2016, 11 pages.
Walker, R.C. et al., "64b/66b Low-Overhead Coding Proposal for Serial Links," IEEE 802.3 High Speed Study Group, Jan. 12, 2000, 17 pages.
PCT International Search Report and Written Opinion, PCT Application No. PCT/US2015/044343, dated Dec. 3, 2015, 10 pages.

* cited by examiner

FULL DUPLEX RADIO IN WIRELESS TUNNELING SYSTEM

CROSS-REFERENCE TO RELATED APPLICATION

This application is a continuation of U.S. patent application Ser. No. 15/073,348 filed on Mar. 17, 2016 entitled "Full Duplex Radio in Wireless Tunneling System," which claims priority under 35 U.S.C. § 119(e) from U.S. Provisional Patent Application No. 62/135,007, entitled "Wireless Tunneling System" filed on Mar. 18, 2015, each of which are incorporated by reference herein in their entirety.

BACKGROUND

1. Field of the Disclosure

Embodiments of the present disclosure generally relate to the field of wireless communication and, more particularly, to a transceiver architecture for wireless tunneling.

2. Description of the Related Art

In a wireless tunneling system, data that is traditionally communicated over a wired communication link is instead tunneled through a wireless channel. To tunnel communication conforming to bi-directional wired protocols, the wireless tunneling system exchange data bi-directionally through a wireless channel. However, a conventional wireless communication system cannot tunnel high data rate wired communication protocol such as Universal Serial Bus (USB), High-Definition Media Interface (HDMI), and DisplayPort (DP) in a cost and power efficient manner.

In wireline communication it is common to use full duplex communication where signals travelling in both direction are present. However, in a wireless communication it is difficult to build a full duplex communication system because of the problem of isolating the weak signal received from the other side of the link from the strong signal generated by the local transmitter. Conventional approaches are to operate the two link directions on different frequencies (frequency division duplex) or to separate the two link directions in time (time division duplex). Both these approaches approximately double the bandwidth of spectrum to realize a bidirectional link compared to a unidirectional link with the same bit rate. Such conventional approaches also employ complex and power inefficient circuitries.

Therefore, the conventional wireless tunneling system is inefficient in terms of bandwidth, power efficiency, and cost.

SUMMARY

Disclosed is a full-duplex wireless tunneling system that bi-directionally tunnels communications between two source apparatuses simultaneously through a wireless link at a common frequency.

In one embodiment, the wireless tunneling system includes two wireless tunneling apparatuses that communicate with each other through the wireless link. A local wireless tunneling apparatus is coupled to a local source apparatus through a wired connection and a remote wireless tunneling apparatus is coupled to the remote source apparatus through another wired connection. The two source apparatuses bi-directionally communicate with each other through the wireless link using the two wireless tunneling apparatuses as if the two source apparatuses were connected through a wired connection.

In one embodiment, the local wireless tunneling apparatus includes a local transmit antenna, a local receive antenna, a local wireless transmitter, and a local wireless receiver. The local transmit antenna has a first polarization, and the local receive antenna has a second polarization different from the first polarization. The local wireless transmitter is coupled to the local transmit antenna. The local wireless transmitter is configured to (i) modulate a carrier signal using on-off keying to generate a local transmit wireless signal centered at a carrier frequency, the carrier signal modulated according to a local transmit baseband signal, the local transmit baseband signal obtained based on an input local data signal from the local source apparatus, and (ii) transmit the local transmit wireless signal through the local transmit antenna. The local wireless receiver is coupled to the local receive antenna. The local wireless receiver includes an on-off keying demodulator and a clock and data recovery circuit coupled to the on-off keying demodulator. The on-off keying demodulator is configured to receive a local receive wireless signal centered at the carrier frequency from the local receive antenna concurrently with the local wireless transmitter transmitting the local transmit wireless signal, and demodulate the local receive wireless signal to a local receive baseband signal. The clock and data recovery circuit is configured to (i) receive the local receive baseband signal, (ii) perform timing recovery on the local receive baseband signal, (iii) recover a digital representation of the local receive baseband signal that is synchronous to a local clock of the recovered digital representation, and (iv) provide a data signal comprising the recovered digital representation to the local source apparatus, the data signal compliant with a wired communication protocol between the local source apparatus and a remote source apparatus.

In one or more embodiments, the local wireless transmitter further comprises a wired receiver and timing recovery block configured to receive the input local data signal from the local source apparatus, and to provide a local transmit digital signal that is synchronous to a local clock; a high frequency transmitting circuit configured to receive the local transmit digital signal according to a first frame structure and a first coding scheme implemented by the wired communication protocol and to recode the local transmit digital signal according to a second frame structure and a second coding scheme implemented by the local wireless transmitter to generate a recoded transmit digital signal; and a digital to analog converter configured to receive the recoded transmit digital signal and to generate the local transmit baseband signal. The local wireless receiver may further comprise a high frequency receiving circuit operating based on a local data clock configured to receive the recovered digital representation, to recode the recovered digital representation according to the first frame structure and the first coding scheme of the wired communication protocol to generate a recoded recovered data signal, and to provide the recoded recovered data signal to the local source apparatus. The high frequency transmitting circuit is configured to pass the local transmit digital signal unmodified, and the high frequency receiving circuit passes the recovered digital representation unmodified. The local wireless transmitter may be configured to perform duobinary encoding on the local transmit data signal to produce a local recoded transmit digital signal with three possible levels, the three levels comprising: a zero level and two non-zero levels with opposite signs. The high frequency transmitting circuit is configured to perform forward error correction encoding, and the high frequency receiving circuit is configured to perform forward error correction decoding.

In one or more embodiments, the local receive wireless signal comprises a signal component corresponding to a remote data signal compliant with the wired communication protocol. The signal component may correspond to a remote transmit wireless signal transmitted through a remote transmit antenna having the second polarization. The signal component may correspond to a remote transmit wireless signal, the remote transmit wireless signal generated by a remote wireless tunneling apparatus according to the remote data signal, the remote wireless tunneling apparatus coupled to the remote source apparatus through a wired connection. The local source apparatus and the remote source apparatus may communicate with each other through the wired communication protocol through a wireless connection between the local wireless tunneling apparatus and a remote wireless tunneling apparatus.

In one or more embodiments, a distance between the local transmit antenna and the local receive antenna is less than 15 cm.

In one or more embodiments, a data rate of the data signal is at least 1 Gbps, and the carrier frequency is above 20 GHz.

In one or more embodiments, the on-off keying demodulator comprises an envelope detector without employing a synthesizer to demodulate the local receive wireless signal.

In one or more embodiments, the clock and data recovery circuit operates at a first baseband frequency to obtain the data signal compliant with the wired communication protocol. The local wireless receiver may further comprise a baseband receiving circuit coupled to the on-off keying demodulator, the baseband receiving circuit operating at a second baseband frequency lower than the first baseband frequency to receive the local receive baseband signal and to generate another data signal not compliant with the wired communication protocol based on the local receive baseband signal.

In one embodiment, a full-duplex transceiver is disclosed. The full-duplex transceiver comprises: a local wireless transmitter coupled to a local transmit antenna having a first polarization, the local wireless transmitter configured to transmit a local transmit wireless signal through the local transmit antenna at a carrier frequency; and a local wireless receiver coupled to a local receive antenna having a second polarization different from the first polarization. The local wireless receiver comprises: a demodulator to demodulate a local receive wireless signal to a local receive baseband signal, the local receive wireless signal received from the local receive antenna at the carrier frequency concurrently with the local wireless transmitter transmitting the local transmit wireless signal, and a clock and data recovery circuit coupled to the demodulator, the clock and data recovery circuit to (i) receive the local receive baseband signal, (ii) perform timing recovery on the local receive baseband signal, (iii) recover a digital representation of the local receive baseband signal that is synchronous to a local clock of the recovered digital representation, and (iv) generate a data signal comprising the recovered digital representation.

In one or more embodiment, a wireless communication apparatus is disclosed. The wireless communication apparatus comprises a local transmit antenna having a first polarization; a local receive antenna having a second polarization different than the first polarization; a local wireless transmitter coupled to the local transmit antenna, comprising a wired receiver and timing recovery block that receives a signal from a physical layer of a wired interface to a data source, and provides a local transmit digital signal that is synchronous to a local clock; a high frequency transmitting circuit that inputs the local transmit digital signal and recodes it according to a frame structure and coding scheme implemented by the local wireless transmitter to generate a recoded transmit digital signal, wherein the local wireless transmitter is configured to modulate the local transmit baseband signal using on-off keying to generate a local transmit wireless signal centered at a carrier frequency, and transmit the local transmit wireless signal through the local transmit antenna; and a local wireless receiver coupled to the local receive antenna, to generate a receive wireless signal according to transmissions from a corresponding remote source transmitter centered around the same carrier frequency and which are concurrent with the local wireless transmitter transmitting the local transmit wireless signal, the local wireless receiver comprising: an on-off keying demodulator, the on-off keying demodulator configured to input the receive wireless signal and demodulate the local receive wireless signal to a local receive baseband signal, a wireless clock/data recovery unit coupled to the on-off keying demodulator, the wireless clock/data recovery unit to (i) receive the local receive baseband signal and (ii) generate a recovered wireless data signal containing a digital representation of the received baseband signal that is synchronous with respect to a local clock, a high frequency receiving circuit operating from that local clock to recode data in the recovered wireless data signal according to link layer requirements of a communication protocol used on the wired interface to the data source, and a wired transmitter block that takes the data and clock from the high frequency receiving circuit and outputs it according to physical layer requirements of the wired protocol on the wired connection to the local source apparatus.

In one or more embodiments, the high frequency receiving circuit is further configured to regenerate a clock synchronous to a remote wired clock.

In one or more embodiments, the high frequency transmitting circuit and high frequency receiving circuit pass respective input digital data signals unmodified.

In one or more embodiments, the local wireless transmitter performs duobinary encoding on received digital data to produce the local transmit digital signal.

In one or more embodiments, the high frequency transmitter circuit performs forward error correction encoding, and the high frequency receiving circuit performs forward error correction decoding.

In one or more embodiments, a wireless communication apparatus comprises: a local transmit antenna having a first polarization; a local receive antenna having a second polarization different than the first polarization; a local wireless transmitter coupled to the local transmit antenna, and configured to receive a signal from a physical layer of a wired interface to a data source, and provide a local transmit digital signal that is synchronous to a local clock; recode the local transmit data signal according to a frame structure and coding scheme implemented by the local wireless transmitter to generate a recoded transmit digital signal, modulate the local transmit baseband signal using on-off keying to generate a local transmit wireless signal centered at a carrier frequency, and transmit the local transmit wireless signal through the local transmit antenna; and a local wireless receiver coupled to the local receive antenna, configured to generate a receive wireless signal according to transmissions from a corresponding remote source transmitter centered around the same carrier frequency and which are concurrent with the local wireless transmitter transmitting the local transmit wireless signal, input the receive wireless signal and demodulate the local receive wireless signal to a local receive baseband signal, generate a recovered wireless data signal containing a digital representation of the received baseband signal that is synchronous with respect to a local clock, recode data in the recovered wireless data signal according to link layer requirements of a communication protocol used on the wired interface to the data source, and output the recoded data according to physical layer requirements of the wired protocol on the wired connection to the local source apparatus.

In one or more embodiments, a method of establishing a full-duplex communication is disclosed. The method includes: receiving, by a local wireless transmitter coupled to a local source apparatus, an input local data signal from the local source apparatus; modulating, by the local wireless transmitter, a carrier signal using on-off keying to generate a local transmit wireless signal centered at a carrier frequency, the carrier signal modulated according to a local transmit baseband signal, the local transmit baseband signal obtained based on the input local data signal from the local source apparatus; transmitting, by the local wireless transmitter, the local transmit wireless signal through a local transmit antenna having a first polarization; receiving, by an on-off keying demodulator, a local receive wireless signal at the carrier frequency from a local receive antenna concurrently with the local wireless transmitter transmitting the local transmit wireless signal, the local receive antenna having a second polarization different from the first polarization; demodulating, by the on-off keying demodulator, the local receive wireless signal to a local receive baseband signal; receiving, by a clock and data recovery circuit, the local receive baseband signal; performing timing recovery, by the clock and data recovery circuit, on the local receive baseband signal; recovering, by the clock and data recovery circuit, a digital representation of the local receive baseband signal that is synchronous to a local clock of the recovered digital representation; and providing a data signal comprising the recovered digital representation to the local source apparatus.

BRIEF DESCRIPTION OF THE DRAWINGS

The teachings of the embodiments disclosed herein can be readily understood by considering the following detailed description in conjunction with the accompanying drawings.

DETAILED DESCRIPTION

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The Figures (FIG.) and the following description relate to the preferred embodiments by way of illustration only. It should be noted that from the following discussion, alternative embodiments of the structures and methods disclosed herein will be readily recognized as viable alternatives that may be employed without departing from the principles of the present invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

Embodiments herein are primarily described in the context of a tunneling system that can be plugged into an arbitrary node in a connected topology, comprising hosts, devices, and hubs. In some embodiments, the wireless tunneling system may operate in the context of a USB 3.0 system. However, the embodiments herein may also be used to communicate using other communication protocols such as different versions of the USB standard or entirely different protocols such as HDMI, DisplayPort, or other serial communication protocols.

Figure 1:
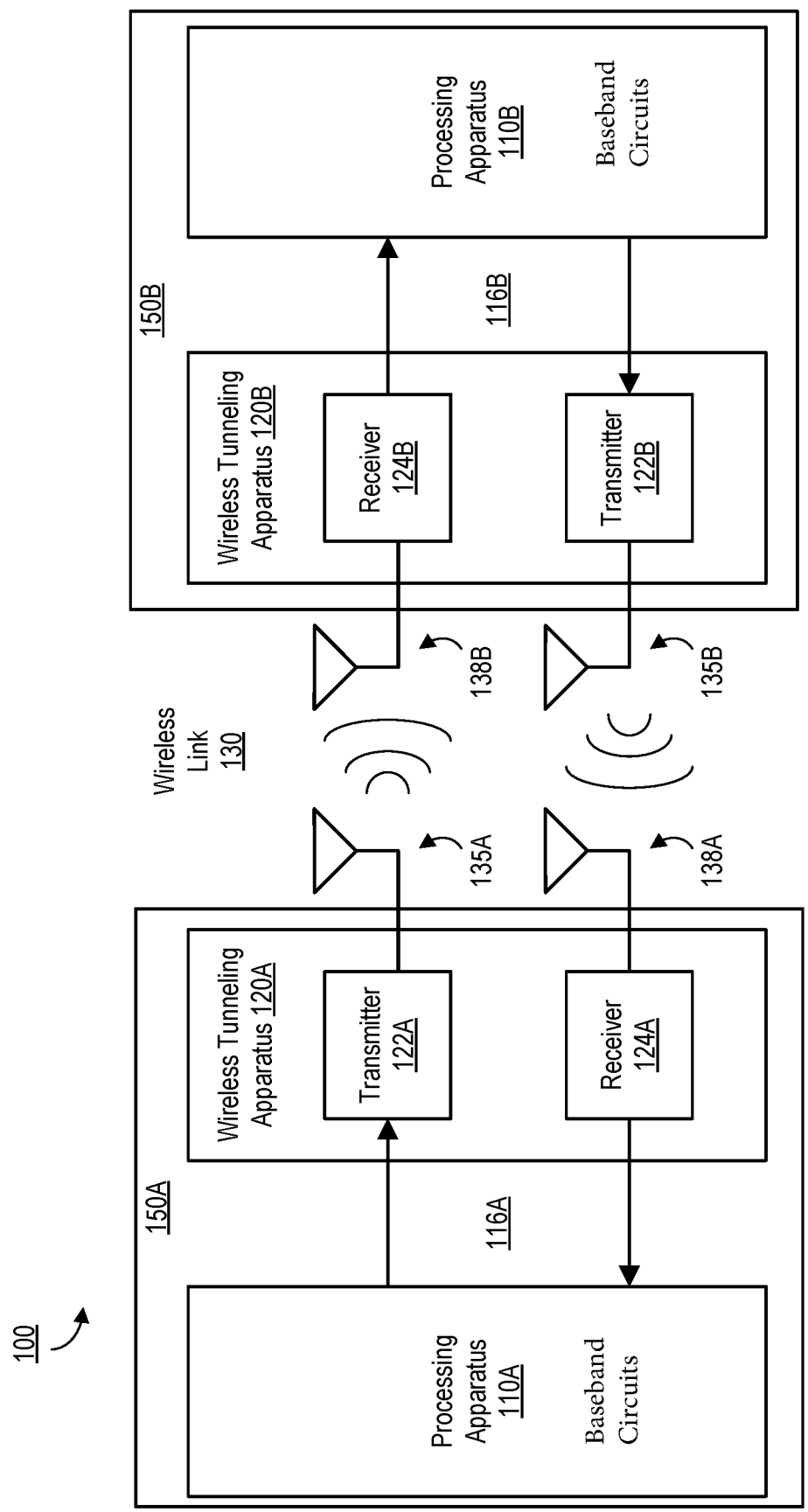
FIG. 1 illustrates one embodiment of a wireless tunneling system.

FIG. 1 illustrates an embodiment of a wireless tunneling system 100. The wireless tunneling system 100 comprises a first computing system 150A communicating with a second computing system 150B via a wireless link 130. The first computing system 150A and the second computing system 150B simultaneously communicate with each other in both directions through the wireless link 130 at a common frequency.

In one embodiment, the wireless link 130 comprises a super high frequency (SHF) or extremely high frequency (EHF) wireless link (e.g., above 20 GHz). The wireless link 130 may be limited to short range communications where the wireless tunneling apparatus 120 are in very close proximity to each other (e.g., less than 15 centimeters). Data transmissions over the wireless link 130 may have a data rate of, for example, 5 Gigabits per second or higher. In other embodiments, the wireless link 130 may be suitable for a long range communications and/or implemented for other frequency bands.

The first computing system 150A includes a processing apparatus 110A coupled to a wireless tunneling apparatus 120A through a wired connection 116A, and the second computing system 150B includes a processing apparatus 110B coupled to a wireless tunneling apparatus 120B through a wired connection 116B. The wireless tunneling apparatuses 120A and 120B (herein also referred to as "wireless tunneling apparatuses 120" or "tunneling apparatuses 120") communicate with each other through the wireless link 130, and tunnel communication between the processing apparatuses 110A and 110B (herein also referred to as "processing apparatuses" 110 or "source apparatuses 110"). A processing apparatus can include an electronic apparatus able to exchange data (unidirectional or bidirectional) compliant with a wired communication protocol with another electronic apparatus. Examples of a processing apparatus include a source device, a sink device, an intermediate device between the source device and the sink device, USB host/device, a storage device, etc. In one embodiment, the wireless tunneling apparatuses 120 communicate with each other in a full-duplex manner. Specifically, the wireless tunneling apparatuses 120 can bi-directionally communicate with each other simultaneously at a common frequency (e.g., 60 GHz) through the wireless link 130. In one embodiment, the wireless tunneling apparatus 120 is embodied as a removable dongle that can couple to a port of the processing apparatus 110 (e.g., a USB port, a HDMI port, or a DisplayPort port). In other embodiments, the wireless tunneling apparatus 120 is internally coupled to the processing apparatus 110 (e.g., via traces on a printed circuit board) or may be fully integrated with the processing apparatus 110 (e.g., in an integrated circuit).

The wireless tunneling apparatus 120 comprises a transmitter 122, a receiver 124, a transmit antenna 135, and a receive antenna 138. The transmitter 122 receives data from the processing apparatus 110 and transmits the data over the wireless link 130 through the transmit antenna 135 to a receiver 124 of a different computing system 150. The receiver 124 receives data over the wireless link 130 from a transmitter 122 of another computing system 150 through the receive antenna 138 and provides the received data to the processing apparatus 110. The wireless tunneling apparatus 120 is capable of full-duplex communication so that it may transmit and receive data over the wireless link 130 simultaneously at the same frequency.

In one embodiment, the transmitter 122 and the receiver 124 are implemented on a same integrated circuit, with transmit and receive antenna on the same package as the integrated circuit, such that separation between the transmit antenna 135 and the receive antenna 138 of the wireless tunneling apparatus 120 is on the order of a few mm. Such close proximity between the transmit antenna 135 and the receive antenna 138 of the wireless tunneling apparatus 120 can obstruct full-duplex communication. Specifically, self-interference due to a signal transmitted from a local transmit antenna 135A of the wireless tunneling apparatus 120A can impede detection of a signal transmitted from a remote transmit antenna 135B of another wireless tunneling apparatus 120 that may be situated further away from the local receive antenna 135B than the local transmit antenna 135A.

In one embodiment, in order to tunnel full-duplex communication (i.e., transmit and receive at the same frequency at the same time), complementary wireless tunneling apparatuses 120 of different types have different antenna polarization so that two different transmitter/receiver antenna pairs can simultaneously operate in both directions. For example, the wireless tunneling apparatus 120A may have a type X transmit antenna 135A and a type Y receive antenna 138A, while the wireless tunneling apparatus 120B has a complementary type Y transmit antenna 135B and a type X receive antenna 138B. In one implementation, the transmit antenna 135A of the wireless tunneling apparatus 120A and the receive antenna 138B of the wireless tunneling apparatus 120B are right hand circular polarized (RHCP), and the transmit antenna 135B of the wireless tunneling apparatus 120B and the receive antenna 138A of the wireless tunneling apparatus 120A are left hand circular polarized (LHCP). In this configuration, each of the wireless tunneling apparatuses 120 is able to receive a wireless signal from the other wireless tunneling apparatus 120 while suppressing a wireless signal transmitted from its own. Accordingly, the self-interference issue can be mitigated.

In one embodiment, the wireless tunneling apparatus 120A implements on-off keying modulation and a data recovery circuit configured to extract a desired signal (e.g., a signal from a remote transmitter 122B of a remote wireless tunneling apparatus 120B) and to suppress the signal transmitted from a local transmitter 122A, as described in detail with respect to FIGS. 2-4 below. Advantageously, the wireless tunneling apparatuses 120 can exchange high data rate information (e.g., over 5 Gbps) through a full-duplex wireless channel despite a close proximity between the transmit antenna 135 and the receive antenna 138 in each wireless tunneling apparatus 120.

The computing system 150 (and the components thereof) may be implemented using analog circuit components, digital logic, software, or a combination thereof. In one embodiment, one or more components of the computing system 150 may be implemented as a processor and a non-transitory computer-readable storage medium storing instructions that when executed by the processor cause the processor to carry out the functions attributed to the components. Alternatively, or in addition, digital components may be implemented as an application specific integrated circuit (ASIC), field-programmable gate array (FGPA), or using a combination of implementations.

In one embodiment, the wireless tunneling system 100 provides a replacement for conventional wired communications such as USB, HDMI, DisplayPort, or other serial communication protocols. For example, rather than the processing apparatuses 110A, 110B communicating directly to each other via a traditional cable, the processing apparatuses 110A, 110B instead communicate with their respective wireless tunneling apparatuses 120A, 120B, which then tunnel the data over a high-speed point-to-point serial wireless link 130.

From the perspective of the processing apparatuses 110A, 110B, the communications may be implemented in the same way as if the processing apparatuses 110A, 110B were directly connected in a conventional configuration. Thus, no modification to a conventional processing apparatus 110A, 110B is necessarily required (e.g., no software modification is necessary). In other words, the wireless tunneling apparatuses 120A, 120B and the wireless link 130 between them may operate as a direct replacement for a conventional cable. For example, each wireless tunneling apparatus 120A, 120B includes an interface that enables it to plug directly into a conventional cable interface of its respective processing apparatus 110A, 110B and the wireless tunneling apparatuses 120A, 120B facilitate communication such that it appears to the processing apparatuses 110A, 110B that they are directly connected. In alternative embodiments, the wireless tunneling apparatuses 120A, 120B may be integrated with their respective processing apparatuses 110A, 110B.

Taking USB as an example, traditional wireless apparatuses with USB interface terminate the USB protocol in the transceiver and re-encode data into a different wireless protocol for transmission. The traditional wireless apparatuses are visible as nodes (USB hubs, USB devices or USB repeaters) in the USB tree topology. In contrast, a disclosed USB tunneling apparatus allows for USB link-layer data traffic to be transmitted without modifications at very low latency and without terminating the USB protocol layers. Hence, such tunneling apparatuses are not visible in the USB topology.

In one embodiment, a wireless tunneling apparatus 120 of one configuration does not perform or replicate the operation of a local processing apparatus 110 of the same configuration, but rather performs or replicates the state and operation of a local processing apparatus 110 of the counterpart configuration. That is, the upstream wireless tunneling apparatus 120A interfacing the upstream processing apparatus 110A through the wired connection 116A mirrors the state and operation of the downstream processing apparatus 110B. By the same token, the downstream wireless tunneling apparatus 120B interfacing the downstream processing apparatus 110B of the through the wired connection 116B mirrors the state and operation of the upstream processing apparatus 110A.

In one embodiment, the wireless tunneling apparatuses 120A, 120B are substantially identical apparatuses except for the complementary antenna polarizations. Alternatively, the wireless tunneling apparatuses 120A, 120B are different complementary apparatus types that have similar high level architectures, but differ in certain architectural or operational characteristics as described herein. For example, in one embodiment, the first wireless tunneling apparatus 120A comprises a first apparatus type configured to operate with a processing apparatus 110A embodied as a docking station, while the second wireless tunneling apparatus 120B comprises a second apparatus type configured to operate with a processing apparatus 110B embodied as a mobile apparatus.

Figure 2:
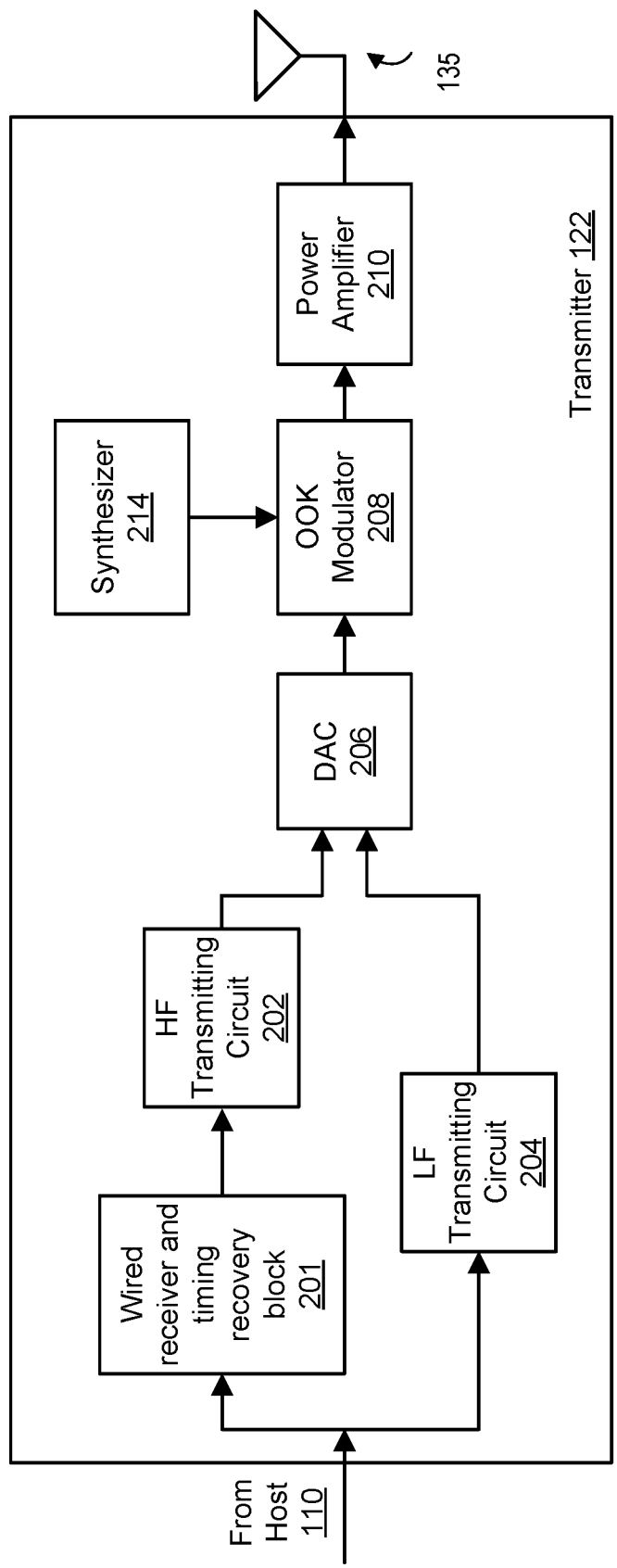
FIG. 2 illustrates an example embodiment of a transmitter of the wireless tunneling system.

FIG. 2 illustrates an example embodiment of a transmitter 122 (e.g., transmitter 122A or transmitter 122B). The transmitter 122 includes a wired receiver and timing recovery block 201, a high frequency (HF) transmitting circuit 202, a low frequency (LF) transmitting circuit 204, and a shared transmit data path comprising a digital-to-analog converter (DAC) 206, an on-off keying modulator 208 (herein also referred to as "an OOK modulator 208"), a synthesizer 214, a power amplifier 210, and the transmit antenna 135. A high frequency transmit data path comprises the HF transmitting circuit 202 and may operate together with or include the shared transmit data path. Similarly, a low frequency transmit data path comprises the LF transmitting circuit 204 and may operate together with or include the shared transmit data path.

The wired receiver and timing recovery block 201 provides an interface with the processing apparatus 110 for receiving digital data, and recovers the signal on the wired connection, operating at an incoming wired symbol clock frequency, to a digital form synchronous with respect to a local clock. For example, in one embodiment, the wired receiver and timing recovery block 201 is circuit block such as a standard USB PHY that receives serial data conforming to a USB protocol and outputs it on a standard PHY interface such as PIPE. In other embodiments, the wired receiver and timing recovery block 201 receives serial data conforming to HDMI protocol, DisplayPort protocol, or other communication protocols.

In one aspect, each bit of useful information on the wired signal is mapped one-to-one on to the wireless link 130. In the simplest form of the tunneling concept, each bit of the wired signal is mapped directly on to a corresponding bit on the wireless link 130.

However, it can be advantageous to use a different line code, frame structure or symbol rate on the wireless link compared to the wired communication protocol. For example, it may be desirable to add forward error correction to the data to tolerate a higher raw bit error rate on the wireless link 130 than expected from the wired protocol. For another example, it may be desirable to combine the signal from more than one wired connection on to a single wireless link. For another example, it may be desirable to use duobinary coding to transform the binary 0/1 digital sequence to three level −1/0/1 duobinary form that can still be demodulated by a conventional OOK receiver to increase the spectral efficiency of the modulation. For another example, it may be desirable to use a more efficient line code to reduce the bandwidth required for the transmission (for example replacing an 8B/10B line code with a scrambler based line code). The high frequency transmitting circuit 202 has the function of performing this transformation and generates a high-speed signal that is directly suitable for wireless transmission. The high frequency transmitting circuit 202 generates a high data rate signal (herein also referred to as "a first transmit baseband signal") at a wireless symbol clock frequency, and provides the high data rate signal to the DAC 206. In different embodiments, the wireless symbol clock frequency and the incoming wired symbol clock frequency may be identical, may be synchronous and related by a rational fraction or may be completely asynchronous.

Note that in this simplest form of a one-to-one mapping between bits on the wire and bits on the wireless link, it is not obvious that it is advantageous to perform timing recovery on the wired connection since an ideal wired baseband signal could be suitable for direct application to an on-off keying modulator. However, when operating at speeds of several Gbps, the wired signal at the end of a cable is far from ideal and can also vary significantly in quality and spectrum as a function of the length of the cable. By performing timing recovery on the wired signal, the performance of and spectrum of the wireless link is completely decoupled from the performance and spectrum of the wired link allowing each to be verified independently and providing flexibility in the length and construction of the wired interconnect. Thus, the special case in which the high frequency transmitting circuit simply passes the recovered bit stream unmodified is important.

The LF transmitting circuit 204 generates a low data rate signal (herein also referred to as "a second transmit baseband signal") that has a substantially lower data rate than the high data rate signal produced by the HF transmitting circuit 202. The low data rate signal typically comprises control signals used to communicate control or state information such as, for example, information for operating in or transitioning between different states, and other state information used for controlling the power state, configuration and/or operation of the wireless tunneling apparatus 120.

The digital-to-analog converter 206 converts the high speed and low speed signals from the HF transmitting circuit 202 and LF transmitting circuit 204 respectively from the digital domain to the analog domain to generate an analog baseband signal. The OOK modulator 208 modulates the carrier signal (generated by the synthesizer 214) according to the analog baseband signal to generate a modulated signal. The OOK modulator 208 pulses the carrier signal on and off to represent different logic states used to encode the data of the analog baseband signal. For example, a logic level '1' is represented as the carrier signal outputted from the OOK modulator 208, and a logic level '0' is represented as no signal outputted from the OOK modulator 208. The power amplifier 210 amplifies the modulated signal to generate an amplified signal (herein also referred to as "a transmit wireless signal") transmitted by the transmit antenna 135 over the wireless link 130. The transmit antenna 135 may be of different type depending on whether the transmitter 122 is a first apparatus type (e.g., for use with a wall-powered dock apparatus) or as second apparatus type (e.g., for use with a battery-powered mobile apparatus).

Operating states of various components of the transmitter 122 can be controlled depending on an operational state of the transmitter 122 in order to improve power efficiency of the transmitter 122. For example, because the power consumption of the HF transmitting circuit 202 is relatively high compared to the LF transmitting circuit 204, the HF transmitting circuit 202 can be configured to operate in a low power state or the HF transmitting circuit 202 can be turned off during a low frequency transmission when the HF transmitting circuit 202 is not being used. During high frequency transmissions, the LF transmitting circuit 204 may be powered down. The digital-to-analog converter 206, OOK modulator 208, synthesizer 214, and power amplifier 210 can be turned off during periods when neither the HF transmitting circuit 202 nor the LF transmitting circuit 204 are operational. This duty-cycling of the transmit data path lends itself to lower power consumption when averaged over time.

Figure 3:
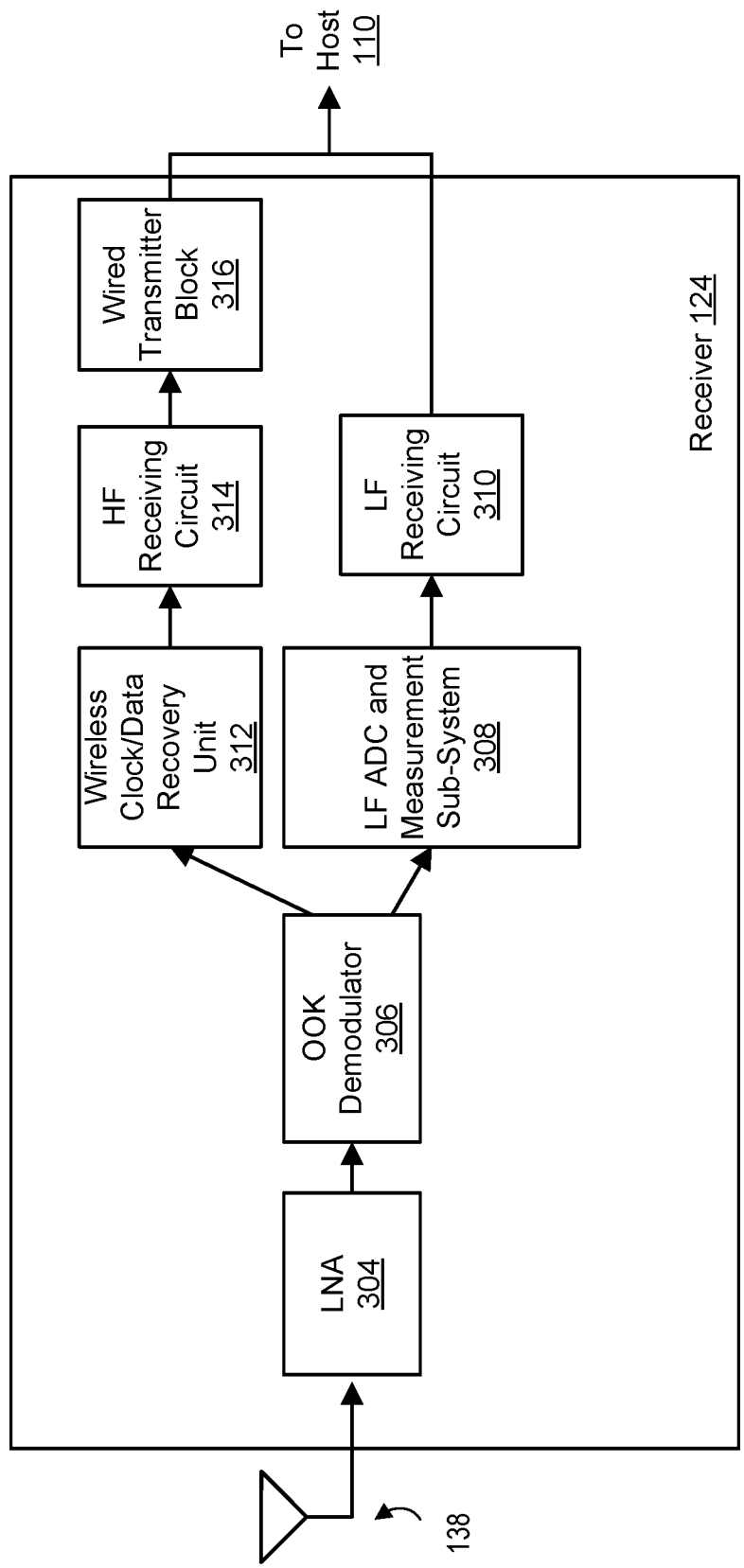
FIG. 3 illustrates an example embodiment of a receiver of the wireless tunneling system.

FIG. 3 illustrates an example embodiment of a receiver 124 (e.g., receiver 124A or 124B). The receiver 124 includes a shared receive data path comprising the receive antenna 138, a low noise amplifier (LNA) 304, and an on-off keying demodulator 306 (herein also referred to as "an OOK demodulator 306"); a high frequency receive data path including a wireless clock/data recovery unit 312 (herein also referred to as "a CDR 312"), a high frequency receiving circuit 314, and a wired transmitter block 316; and a low frequency receive data path including a low frequency analog-to-digital converter and measurement sub-system 308, and a low frequency receiving circuit 310. In one embodiment, the OOK demodulator 306, the CDR 312 and the HF receiving circuit 314 operate together to suppress crosstalk noise due to a wireless signal transmitted from a local transmitter and to extract a desired signal from a remote wireless transmitter of another wireless tunneling apparatus 120 for full-duplex wireless communication. The OOK demodulator 306, the low frequency analog-to-digital converter and measurement sub-system 308, and the low frequency receiving circuit 310 operate together to obtain control information from another wireless tunneling apparatus 120. The high frequency receive data path may operate together with or include the shared receive data path. Similarly, the low frequency receive data path may operate together with or includes the shared receive data path.

The receive antenna 138 receives a wireless signal (herein also referred to as "a receive wireless signal") via the wireless link 130 which is amplified by the low noise amplifier 304. The receive antenna 138 may be of different type depending on whether the receiver 124 is a first apparatus type (e.g., for use with a dock apparatus) or as second apparatus type (e.g., for use with a mobile apparatus). The low noise amplifier 304 provides gain and incorporates automatic gain control to ensure an optimal signal level at the input of the OOK demodulator 306. The OOK demodulator 306 demodulates the amplified wireless signal (or amplified RF signal) to recover a baseband signal (herein also referred to as "a receive baseband signal"). In one embodiment, the OOK demodulator 306 is implemented as an RF envelope detector, which detects the envelope of the amplified signal to recover the baseband signal. For example, the RF envelope detector applies a non-linear (e.g., square law) amplification to rectify the amplified RF signal, and then filters out the high-frequency components to provide the baseband signal.

The receive baseband signal at the output of the OOK demodulator 306 may be impaired by the crosstalk from the local transmitter 122 and other wireless impairments such as additive front end noise. This crosstalk adds both amplitude noise and timing jitter to the receive baseband signal such that the quality of the baseband signal corresponding to a desired signal from a remote transmitter may be much poorer than transmitter signal transmitted through a wired connection carrying the same data and may not be adequate to allow reliable decoding by a downstream wired device.

In the high frequency receive data path, the wireless clock/data recovery unit 312 performs timing recovery on the impaired receive baseband signal to recover a digital representation of the received baseband signal ("recovered data") that is synchronous with respect to a local clock ("local data clock"). The regeneration to digital form suppresses the amplitude noise added to the receive baseband signal.

In one embodiment, the wireless symbol clock used by the remote transmitter 122B is synchronous to the remote incoming wired symbol clock. In this embodiment, the wireless clock/data recovery unit 312 further generates a local recovered clock that is synchronous to the wireless symbol clock and thus synchronous to the remote source wired symbol clock. The local recovered clock is then used by the local wired transmitter block 316 to generate the symbol clock for the outgoing wired connection. The timing jitter added to the receive baseband signal by the wireless crosstalk is suppressed by the transfer function of the timing recovery loop in the clock/data recovery unit. Thus, by suppression of the amplitude noise and suppression of the timing jitter, the quality of the signal output on the local wired output can approach that of a conventional wired output.

In one embodiment, the wireless symbol clock is asynchronous to the incoming wired symbol clock. In one aspect, the wireless symbol clock is faster than the incoming wired symbol clock. The link layer of the wired connection protocol contains a mechanism for clock compensation that allows a small fraction of clock compensation characters to be added or deleted to the data stream to accommodate small differences between remote and local wired clocks. The local data clock is asynchronous to the remote wireless symbol clock. In this embodiment, the wired transmitter block 316 performs the necessary insertion and deletion of clock compensation characters. In this approach, the symbol clock for the wired transmitter block 316 can be derived directly from a clean local reference independent of the jitter in the received baseband signal. Thus, by suppression of the amplitude noise and suppression of the timing jitter, the quality of the signal output on the local wired output can be as good as a conventional wired output with no degradation from the wireless crosstalk or other wireless impairments. For example, occasional characters carrying no useful information called idle or skip characters can be inserted to allow a downstream receiver with local clock slower than the transmitter by a few parts per million to process the data without overrun. The wired transmitter block can adjust the number of idle characters transmitted on the outgoing wired link to prevent underrun while preserving all the characters carrying useful information verbatim. For example, when the local clock is fast and the source wired clock is slow, additional idle characters are inserted as needed to avoid underrun. In the opposite case, when the local clock is slow and the source wired clock is fast, some or all of the idle characters are removed from the stream. In this latter case, compliant insertion of idle characters by the source wired device guarantees that the absolute rate of useful characters in the outgoing wired data link cannot cause overrun in the downstream wired device even if the rate of idle characters in the outgoing wired link generated by the wired transmitter block is non-compliant with the requirements of the wired protocol.

In one embodiment, the wireless symbol clock may be faster than the symbol clock of the wired connection, but the link layer of the wired connection protocol does not necessarily contain a mechanism for clock compensation. In this case, a local wired symbol clock that is synchronous to the remote wired symbol clock can be generated from a local fixed frequency reference by a variety of schemes (such as using a fractional PLL whose divider input is adjusted slowly by a tracking loop that maintains a constant FIFO depth in an elasticity buffer). This scheme again provides almost complete suppression of the timing jitter added to the receive baseband signal by the wireless crosstalk.

The high frequency receiving circuit 314 receives the recovered data from the wireless clock/data recovery unit 312 and if necessary reformats according to the link layer requirements of the wired protocol suitable for interfacing to the processing apparatus 110 on wired connection 116. It may include functions such as line decoding or forward error decoding or splitting of the wireless signal in to multiple streams going to different wired connections. For example, the HF receiving circuit 314 may generate a data signal conforming to the USB protocol, HDMI protocol, DisplayPort protocol, or other data protocol associated with the processing apparatus.

The wired transmitter block 316 receives the link layer digital data from the high frequency receiving circuit 314 and outputs it according to the physical layer requirements of the wired protocol through the wired connection 116.

The timing recovery performed by the wireless clock/data recovery unit 312 generally allows for a scheme to be devised such that the timing jitter of the wired transmit signal is independent of the jitter added to the wireless receive baseband signal by crosstalk.

In the low frequency receive data path, the LF ADC and measurement sub-system 308 converts the baseband signal to a digital representation and provides the digital signal to the LF receiving circuit 310. The LF receiving circuit 310 processes the digital signal to generate a signal representing control (herein also referred to as "a control signal" or "control information") for controlling operational state of the components in the receiver 124 or status information for providing to the processing apparatus 110. In one aspect, the control information is received through a protocol that is different from or not compliant with the high-speed wired communication protocol of the data signal provided through the HF receiving circuit 314. The control signal from LF receiving circuit 310 is employed to control power state of various components of the receiver 124, including that of the HF receiving circuit 314. It is also used to initiate wakeup of the processing apparatus 110 when operating in a low power state.

In one embodiment, the operational state of the receiver 124 can be controlled to improve power efficiency of the receiver 124. For example, because the power consumption of the HF receiving circuit 314 is relatively high compared to the LF receiving circuit 310, the HF receiving circuit 314 can be controlled to operate in a low power state or turned off during a low frequency transmission when the HF receiving circuit 314 is not being used. Similarly, the wireless clock/data recovery unit 312 can be powered down during a low frequency transmission. During high frequency transmissions, the low frequency components such LF receiving circuit 310 may be powered down.

The architecture of the low frequency receive data path is well suited for low power operation. In contrast to a conventional receive architecture, the receive data path of the receiver 124 does not include a synthesizer, which typically consumes substantial power in a traditional receiver architecture. Instead, the receiver 124 can recover both the low and high frequency transmissions based on envelope detection, thereby operating at significantly lower power than a traditional receiver. This low-power RF architecture based on on-off keying and using RF envelope detector does not depend on a fixed local oscillator frequency.

Figure 4:
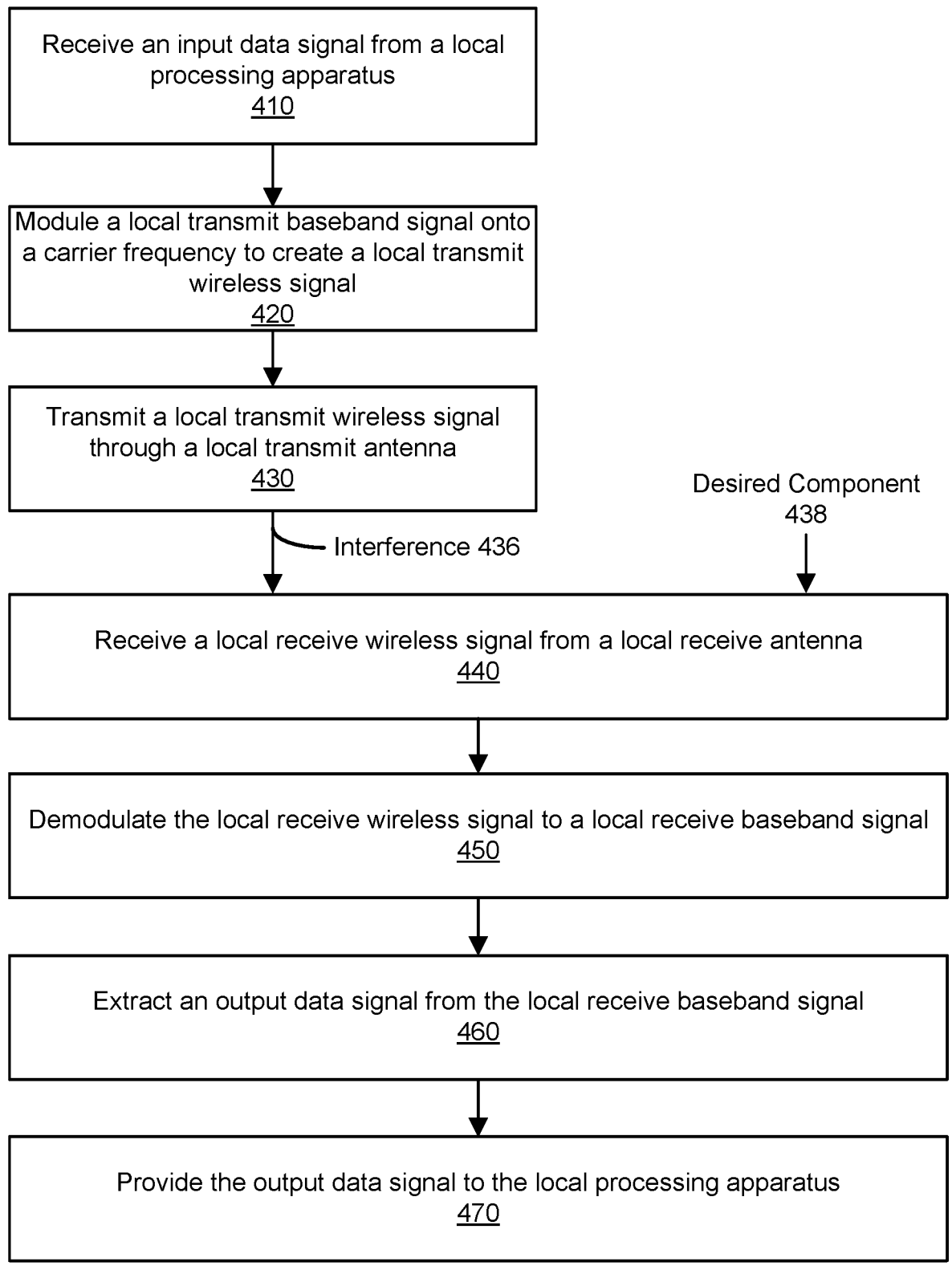
FIG. 4 an example process of a wireless tunneling apparatus tunneling communication between two processing apparatuses through full-duplex wireless channel according to one embodiment.

FIG. 4 an example process performed by a wireless tunneling apparatus 120 to tunnel communication between two processing apparatuses through a full-duplex wireless channel according to one embodiment.

The local wireless tunneling apparatus 120A receives 410 an input local data signal from a local processing apparatus 110A. The local wireless tunneling apparatus 120A receives the input local data signal through a wired connection (e.g., cable or a trace). The local wireless tunneling apparatus 120A modulates 420 the input local data signal onto a local carrier frequency to generate a local transmit wireless signal, and transmits 430 the local transmit wireless signal through a local transmit antenna 135A at a carrier frequency (e.g., 60 GHz).

Concurrently, the local wireless tunneling apparatus 120A receives 440 a local receive wireless signal at the carrier frequency through a local receive antenna 138A. If transmitting and receiving concurrently, the local receive wireless signal may include a first component (e.g., a desired component 438) corresponding to a wireless signal transmitted from a remote transmit antenna 135B of the remote wireless tunneling apparatus 120B, and a second component representing noise/interference 436 due to a wireless signal transmitted from the local transmit antenna 135A of the local wireless tunneling apparatus 120A. Despite the close proximity between the local transmit antenna 135A and the local receive antenna 135B, polarizations of the antennas 135A, 135B, 138A, and 138B cause the first component corresponding to the wireless signal of the remote transmit antenna 135B received at the receiver 124A through the local receive antenna 138A to be substantially stronger than the second component corresponding to the wireless signal of the local transmit antenna 135A received at the receiver 124A through the local receive antenna 138A.

The local wireless tunneling apparatus 120A demodulates 450 the local receive wireless signal to a local receive baseband signal, for example, through an OOK demodulator (e.g., envelope detector). The demodulated signal includes an output data signal corresponding to a desired signal (e.g., an input remote data signal from the remote processing apparatus 110B) and may include the crosstalk noise resulting from the local receive antenna 138A picking up the local transmit wireless signal from the local transmit antenna 135A. The local wireless tunneling apparatus 120A extracts 460 the output data signal from the local receive baseband signal. The local wireless tunneling apparatus 120A provides 470 the output data signal to the local processing apparatus 110A through the HF receiving circuit 314.

In one example, a variety of modern wireline communication protocols support full duplex data rates of 5 Gbps or more in each direction (for example, USB3, PCIE 2.0 and later). Ability to transport those protocols over a wireless medium at the physical layer has many potential applications. The radio spectrum allocation around 60 GHz is available for unlicensed use in many countries and provides 7 GHz of radio spectrum.

An approach of time division duplex has an additional disadvantage that it introduces latency in to the data link equal to the duration of the time slot. Some of the wireline protocols have tight latency constraints (for example, transport of USB HS packets allows a round trip latency of only 1.5 microsecond) which are rather short compared to the time typically required to accomplish receive/transmit turn-around of a radio. Adopting a time slot sufficiently small to meet these latency requirements would incur a very large additional overhead in data rate. Even in cases where latency is not critical and the slot time is longer, time divisional duplex requires buffering of the input signal to avoid loss of data and the inclusion of buffering for high data rate systems increases the size and cost of the time divisional duplex system.

An approach of frequency division duplex may overcome the latency problem but still to transport more than 2×5 Gbps in, 7 GHz of spectrum requires a modulation scheme with a spectral efficiency of 1.4 bits/Hz or more. Spectral efficiency in this class requires coherent demodulation (for example QPSK or 16-QAM) or multilevel modulation both of which introduce significant complexity and cost to the radio design. Frequency division duplex also requires both channel separation and additional circuit complexity in the form of transmit and receive filters: the attenuation provided by the receive filter provides additional isolation from the strong local transmitter signal. For comparison, single carrier radio designs from 802.11ad in the same band realize spectral efficiencies of 0.6 bits/Hz using BPSK and 1.2 bits/Hz using QPSK (1.25 Gbps in 2.16 GHz using BPSK, 2.5 Gbit using QPSK).

A radio using binary on-off keying modulation (or variations such as duobinary modulation) can be implemented with a simple, low cost circuit structure with incoherent demodulation. However, the binary on-off keying modulation scheme suffers from a poor spectral efficiency.

Advantageously, by employing an OOK modulation scheme and suppressing crosstalk through the clock and data recovery circuit as disclosed herein, high-speed (e.g., 5 Gbps) wired communication can be wirelessly tunneled in a power and bandwidth efficient manner through a full-duplex wireless communication.

Upon reading this disclosure, those of skill in the art will appreciate still additional alternative embodiments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope described herein.

What is claimed is:

1. A full-duplex transceiver comprising:
   a local wireless transmitter coupled to a local transmit antenna having a first polarization, the local wireless transmitter configured to transmit a local transmit wireless signal through the local transmit antenna at a carrier frequency; and
   a local wireless receiver coupled to a local receive antenna having a second polarization different from the first polarization, the local wireless receiver configured to receive a local receive wireless signal through the local receive antenna on the carrier frequency, the local receive wireless signal received concurrently with transmission of the local transmit wireless signal, wherein the local wireless receiver comprises a clock and data recovery circuit to (i) receive a local receive baseband signal derived from the local wireless receive signal, (ii) perform timing recovery on the local receive baseband signal, (iii) recover a digital representation of the local receive baseband signal that is synchronous to a local clock of the recovered digital representation, and (iv) generate a data signal comprising the recovered digital representation,
   wherein the local wireless transmitter, the local wireless receiver, the local transmit antenna, and the local receive antenna are integrated on a same package;
   wherein the clock and data recovery circuit operates at a first baseband frequency to obtain the data signal, and
   wherein the local wireless receiver further comprises a baseband receiving circuit, the baseband receiving circuit operating at a second baseband frequency lower than the first baseband frequency to receive the local receive baseband signal and to generate another data signal based on the local receive baseband signal.

2. The full-duplex transceiver of claim 1, wherein the local wireless receiver comprises:
   a demodulator to demodulate a local receive wireless signal to a local receive baseband signal.

3. The full-duplex transceiver of claim 2, wherein the demodulator comprises an on-off keying demodulator.

4. The full-duplex transceiver of claim 2, wherein the demodulator comprises an envelope detector without employing a synthesizer to demodulate the local receive wireless signal.

5. The full-duplex transceiver of claim 1, wherein a data rate of the data signal is at least 1 Gbps.

6. The full-duplex transceiver of claim 1, wherein a distance between the local transmit antenna and the local receive antenna is less than 10 millimeters.

7. The full-duplex transceiver of claim 1, wherein the carrier frequency is above 20 GHz.

8. The full-duplex transceiver of claim 1, wherein the local wireless transmitter comprises:
   a transmit baseband circuit to obtain a local transmit baseband signal based on an input local data signal received from a local source apparatus; and
   a transmit modulator to modulate the carrier signal to generate a local transmit wireless signal centered at the carrier frequency according to the local transmit baseband signal.

9. The full-duplex transceiver of claim 8, wherein the transmit modulator comprises an on-off keying modulator to modulate the carrier signal using on-off keying.

10. The full-duplex transceiver of claim 8, wherein the local wireless transmitter further comprises:
    a duobinary encoder to perform duobinary encoding the local transmit data signal to produce a local recoded transmit digital signal with three possible levels: a zero level and two non-zero levels with opposite signs.

11. A method for operating a full-duplex transceiver, the method comprising:
    transmitting, by a local wireless transmitter, a local transmit wireless signal having a carrier frequency through a local transmit antenna that applies a first polarization to the local transmit wireless signal;
    receiving, by a local wireless receiver through a local receive antenna that is integrated on a same package as the local wireless receiver, the local wireless transmitter and the local transmit antenna, a local receive wireless signal having the carrier frequency and having a second polarization different than the first polarization;
    wherein the local wireless receiver comprises a clock and data recovery circuit to (i) receive a local receive baseband signal derived from the local wireless receive signal, (ii) perform timing recovery on the local receive baseband signal, (iii) recover a digital representation of the local receive baseband signal that is synchronous to a local clock of the recovered digital representation, and (iv) generate a data signal comprising the recovered digital representation, wherein the clock and data recovery circuit operates at a first baseband frequency to obtain the data signal; and wherein the local wireless receiver further comprises a baseband receiving circuit, the baseband receiving circuit operating at a second baseband frequency lower than the first baseband frequency to receive the local receive baseband signal and to generate another data signal based on the local receive baseband signal.

12. The method of claim 11, further comprising:
demodulating, by a demodulator of the local wireless receiver, the local receive wireless signal to generate a local receive baseband signal.

13. The method of claim 12, wherein demodulating the local receive wireless signal comprising applying on-off keying demodulation.

14. The method of claim 12, wherein demodulating the local receive wireless signal comprises applying an envelope detector to the local receive wireless signal without employing a synthesizer.

15. The method of claim 11, further comprising:

receiving, by a clock and data recovery circuit, a local receive baseband signal derived from the local wireless receive signal;

performing, by the clock and data recovery circuit, timing recovery on the local receive baseband signal;

recovering, by the clock and data recovery circuit, a digital representation of the local receive baseband signal that is synchronous to a local clock of the recovered digital representation;

and generating, by the clock and data recovery circuit, a data signal comprising the recovered digital representation.

16. The method of claim 15, wherein a data rate of the data signal is at least 1 Gbps.

17. The method of claim 11, wherein a distance between the local transmit antenna and the local receive antenna is less than 10 millimeters.

18. The method of claim 11, wherein the carrier frequency is above 20 GHz.

* * * * *